United States Patent
Ishikawa (10) Patent No.: US 11,372,082 B2
(45) Date of Patent: Jun. 28, 2022

(54) SIGNAL PROCESSING DEVICE, RADAR DEVICE AND SIGNAL PROCESSING METHOD

(71) Applicant: DENSO TEN Limited, Kobe (JP)

(72) Inventor: Hiroki Ishikawa, Kobe (JP)

(73) Assignee: DENSO TEN Limited, Kobe (JP)

( * ) Notice: Subject to any disclaimer, the term of this patent is extended or adjusted under 35 U.S.C. 154(b) by 42 days.

(21) Appl. No.: 16/711,525

(22) Filed: Dec. 12, 2019

(65) Prior Publication Data

US 2020/0355816 A1 Nov. 12, 2020

(30) Foreign Application Priority Data

May 10, 2019 (JP) .............................. JP2019-089945

(51) Int. Cl.
| | | |
|---|---|---|
| *G01S 7/35* | (2006.01) | |
| *G01S 13/34* | (2006.01) | |
| *G01S 13/931* | (2020.01) | |
| *G01S 13/42* | (2006.01) | |
| *G01S 7/288* | (2006.01) | |

(52) U.S. Cl.
CPC .............. *G01S 7/354* (2013.01); *G01S 13/34* (2013.01); *G01S 7/2883* (2021.05); *G01S 13/42* (2013.01); *G01S 13/931* (2013.01)

(58) Field of Classification Search
CPC ...... G01S 7/354; G01S 13/34; G01S 13/5246; G01S 2007/2883; G01S 13/931; G01S 2007/356

See application file for complete search history.

(56) References Cited

U.S. PATENT DOCUMENTS

| | | | | |
|---|---|---|---|---|
| 9,575,170 B2* | 2/2017 | Kurono | .................. | G01S 13/42 |
| 2020/0103517 A1* | 4/2020 | Kim | ........................ | G01S 17/58 |

FOREIGN PATENT DOCUMENTS

JP 2018-136232 A 8/2018

* cited by examiner

*Primary Examiner* — Matthew M Barker
(74) *Attorney, Agent, or Firm* — Oliff PLC (57) ABSTRACT

A signal processing device includes: an acquisition unit configured to acquire phase information of a reception signal of each of plural virtual antennas generated based on a combination of plural transmission antennas and plural reception antennas; a first calculation unit configured to calculate, based on the phase information, at least one first phase difference between the plural transmission antennas in an outward path along which a transmission wave transmitted from the plural transmission antenna reaches a target; a second calculation unit configured to calculate, based on the phase information, at least one second phase difference between the plural reception antennas in a return path along which a reflected wave reflected by the target reaches the plural reception antennas; and a determination unit configured to determine, based on the first phase difference and the second phase difference, whether the outward path and the return path match each other.

11 Claims, 6 Drawing Sheets

| VIRTUAL ANTENNA | TRANSMISSION ANTENNA | RECEPTION ANTENNA |
|---|---|---|
| VRx1 | Tx1 | Rx1 |
| VRx2 | Tx1 | Rx2 |
| VRx3 | Tx2 | Rx1 |
| VRx4 | Tx2 | Rx2 |
| VRx5 | Tx3 | Rx1 |
| VRx6 | Tx3 | Rx2 |

| VIRTUAL ANTENNA | TRANSMISSION ANTENNA | RECEPTION ANTENNA |
|---|---|---|
| VRx1 | Tx1 | Rx1 |
| VRx2 | Tx1 | Rx2 |
| VRx3 | Tx2 | Rx1 |
| VRx4 | Tx2 | Rx2 |
| VRx5 | Tx3 | Rx1 |
| VRx6 | Tx3 | Rx2 |

Cb1-1 → VRx1, VRx2
Cb1-2 → VRx3, VRx5
Cb1-3 → Rx1
Cb1-4 → Rx2

FIG. 10

| VIRTUAL ANTENNA | TRANSMISSION ANTENNA | RECEPTION ANTENNA |
|---|---|---|
| VRx1 | Tx1 | Rx1 |
| VRx2 | Tx1 | Rx2 |
| VRx3 | Tx2 | Rx1 |
| VRx4 | Tx2 | Rx2 |
| VRx5 | Tx3 | Rx1 |
| VRx6 | Tx3 | Rx2 |

Cb2-1 → Rx1, Rx2 (Tx1)
Cb2-2 → Rx1, Rx2 (Tx2)
Cb2-3 → Rx1, Rx2 (Tx3)

SIGNAL PROCESSING DEVICE, RADAR DEVICE AND SIGNAL PROCESSING METHOD

CROSS-REFERENCE TO RELATED APPLICATIONS

This application is based upon and claims the benefit of priority from prior Japanese patent application No. 2019-089945, filed on May 10, 2019, the entire contents of which are incorporated herein by reference.

BACKGROUND

Technical Field

The present invention relates to a signal processing device, a radar device, and a signal processing method.

Related Art

A radar device transmits a radio wave, and measures a distance, a relative velocity, and an azimuth of a target upon receiving the radio wave reflected from the target. When the distance and the like relating to the target is measured, it is assumed that a path along which the radio wave transmitted from the radar device reaches the target (outward path) matches a path along which the radio wave reflected by the target returns to the radar device (return path). However, radio waves received by the radar device include radio waves whose outward paths and return paths do not match each other, and a target that is not originally present (i.e. a ghost) may be erroneously detected.

A radar device disclosed in JP-A-2018-136232 includes a transmission antenna group, a reception antenna group, a first detection unit, a second detection unit, and an identification unit. The first detection unit detects a signal corresponding to a target based on a radio wave transmitted from a first transmission antenna and received by the reception antenna group. The second detection unit performs transform processing corresponding to a transmission antenna interval on the radio wave transmitted from the first transmission antenna and received by the reception antenna group, and a radio wave transmitted from a second transmission antenna and received by the reception antenna group, and detects a signal corresponding to the target. The identification unit compares detection results obtained by the first detection unit and the second detection unit, and identifies whether the signal corresponding to the target is a real image or a virtual image. Accordingly, even when multipath propagation occurs, it is possible to distinguish between a virtual image and a real image.

SUMMARY

In the method of JP-A-2018-136232, in order to distinguish between the virtual image and the real image, it is necessary to perform radio wave transmission and reception for detection by the first detection unit and radio wave transmission and reception for detection by the second detection unit. A load of the signal processing may increase.

In view of the above circumstances, an object of the present disclosure relates to providing a technology which is capable of determining whether the outward path and the return path match each other while suppressing the processing load increase.

[1] According to an aspect of the present disclosure, there is provided a signal processing device, including: an acquisition unit configured to acquire phase information of a reception signal of each of plural virtual antennas generated based on a combination of plural transmission antennas and plural reception antennas; a first calculation unit configured to calculate, based on the phase information, at least one first phase difference between the plural transmission antennas in an outward path along which a transmission wave transmitted from the plural transmission antenna reaches a target; a second calculation unit configured to calculate, based on the phase information, at least one second phase difference between the plural reception antennas in a return path along which a reflected wave reflected by the target reaches the plural reception antennas; and a determination unit configured to determine, based on the at least one first phase difference and the at least one second phase difference, whether the outward path and the return path match each other.

[2] In the signal processing device according to [1], the first calculation unit may calculate the at least one first phase difference by comparing the phase information for each of the plural virtual antennas with each other, the plural virtual antennas being generated by combining different transmission antennas of the plural transmission antennas with a predetermined reception antenna of the plural reception antennas, and the second calculation unit may calculate the at least one second phase difference by comparing the phase information for each of the plural virtual antennas with each other, the plural virtual antennas being generated by combining different reception antennas of the plural reception antennas with a predetermined transmission antenna of the plural transmission antennas.

[3] In the signal processing device according to [1] or [2], the determination unit may determine whether the outward path and the return path match each other based on the at least one first phase difference and the at least one second phase difference in which a distance between the plural reception antennas is same as a distance between the plural transmission antennas in the at least one first phase difference.

[4] In the signal processing device according to any one of [1] to [3], in a case where the at least one first phase difference includes plural first phase differences, the determination unit may use an average value of the plural first phase differences as the at least one first phase difference in determining whether the outward path and the return path match each other, and, in a case where the at least one second phase difference includes plural second phase differences, the determination unit may use an average value of the plural second phase differences as the at least one second phase difference in determining whether the outward path and the return path match each other.

[5] In the signal processing device according to any one of [1] to [4], the first calculation unit may further calculate, based on the at least one first phase difference, a first phase reflection candidate value which is a phase difference candidate value when a phase reflection occurs, and the determination unit may determine whether the outward path and the return path match each other based on the at least one first phase difference, the at least one second phase difference, and the first phase reflection candidate value.

[6] In the signal processing device according to any one of [1] to [5], the second calculation unit may calculate, based on the at least one second phase difference, a second phase reflection candidate value which is a phase difference candidate value when phase reflection occurs, and the determination unit may determine whether the outward path and the return path match each other based on the at least one first phase difference, the at least one second phase difference, and the second phase reflection candidate value.

[7] According to another aspect of the present disclosure, there is provided a radar device, including: the signal processing device according to any one of [1] to [6]; the plural transmission antennas; and the plural reception antennas.

[8] According to another aspect of the present disclosure, there is provided a signal processing method, including: acquiring phase information of a reception signal of each of plural virtual antennas based on a combination of plural transmission antennas and plural reception antennas; calculating, based on the phase information, at least one first phase difference between the plural transmission antennas in an outward path along which a transmission wave transmitted from the plural transmission antenna reaches a target; calculating, based on the phase information, at least one second phase difference between the plural reception antennas in a return path along which a reflected wave reflected by the target reaches the plural reception antenna; and determining, based on the at least one first phase difference and the at least one second phase difference, whether the outward path and the return path match each other.

According to the present disclosure, whether the outward path and the return path match each other may be determined while the processing load increase is suppressed.

BRIEF DESCRIPTION OF DRAWINGS

Exemplary embodiment(s) of the present invention will be described in detail based on the following figures, wherein.

DETAILED DESCRIPTION

Hereinafter, an exemplary embodiment of the present invention will be described in detail with reference to the drawings.

<1. Configuration of Radar Device>

Figure 1:
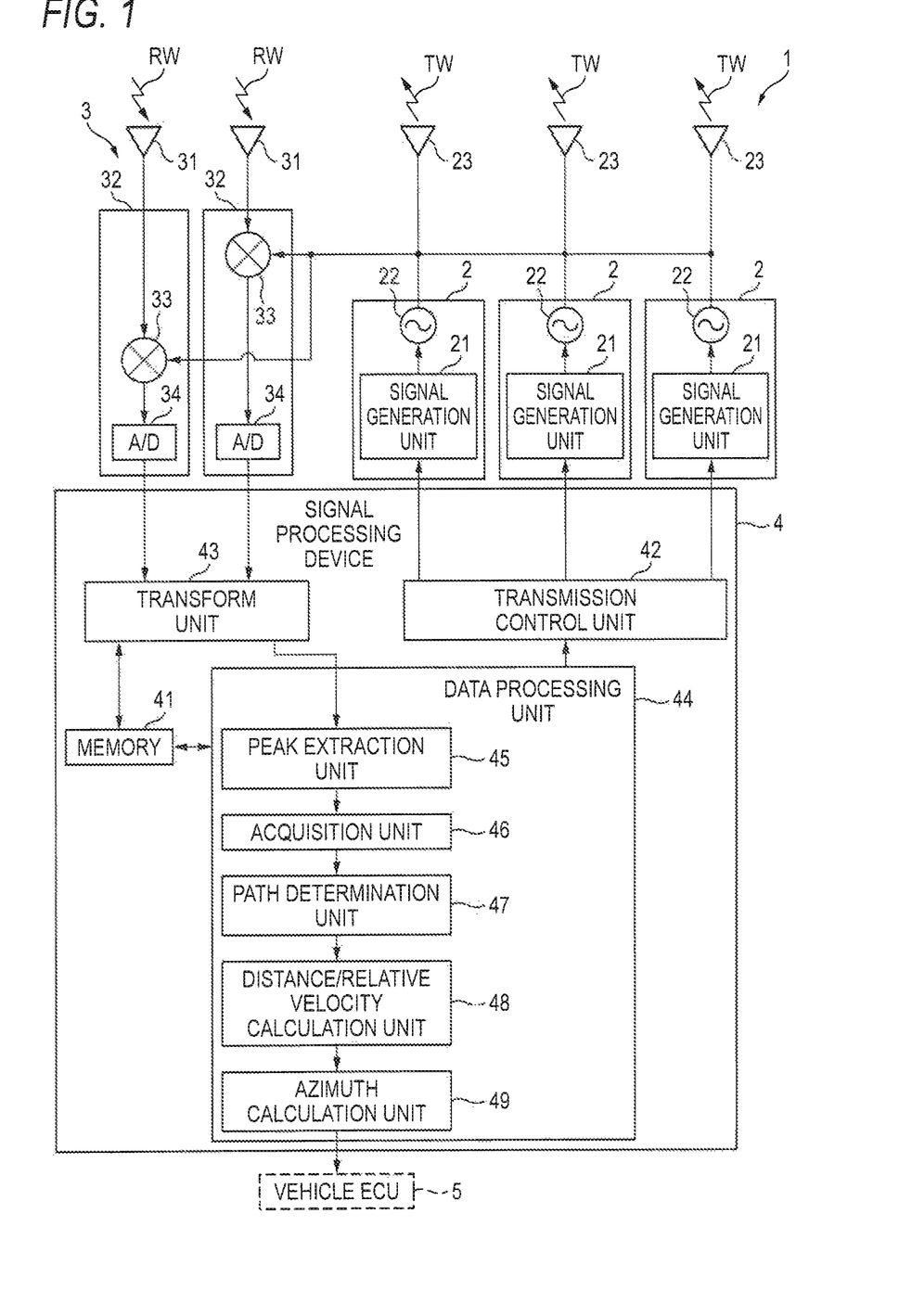
FIG. 1 shows a configuration of a radar device according to an exemplary embodiment.

FIG. 1 shows a configuration of a radar device 1 according to an embodiment of the present invention. The radar device 1 may be mounted on a moving body, such as a vehicle, a robot, an aircraft, or a watercraft. In the present embodiment, the radar device 1 is placed on a vehicle, such as an automobile. Hereinafter, the vehicle on which the radar device 1 is placed is referred to as the given vehicle.

The radar device 1 is used to detect targets around a given vehicle on which the radar device 1 is mounted, such as other vehicles, road signs, guardrails, and people. A detection result of a target is output to a storage device of the given vehicle or a vehicle electronic control unit (ECU) 5 that controls behaviors of the given vehicle. The detection result of the target is used in vehicle control, such as, for example, a pre-crash safety system (PCS) or an advanced emergency braking system (AEBS).

As shown in FIG. 1, the radar device 1 includes plural transmission units 2, a reception unit 3, and a signal processing device 4. In the present embodiment, the radar device 1 is preferably a so-called multiple-input and multiple-output (MIMO) radar device. The radar device 1 is preferably a radar device of fast-chirp modulation (FCM) type that transmits chirp waves whose frequency continuously increase or decrease, and detects distance and relative velocity of each target within a detection range.

The transmission unit 2 includes a signal generation unit 21 and an oscillator 22. The signal generation unit 21 generates a modulation signal whose voltage changes in a saw tooth waveform, and supplies the modulation signal to the oscillator 22. The oscillator 22 generates a transmission signal which is a chirp signal based on the modulation signal generated by the signal generation unit 21, and outputs the transmission signal to a transmission antenna 23.

The radar device 1 includes plural transmission antennas 23. In the present embodiment, the number of the transmission antennas 23 is three. The number of the transmission units 2 is also three in accordance with the number of the transmission antennas 23. However, the number of the transmission antennas 23 may be a plural number other than three. The number of the transmission units 2 may also be changed according to the number of the transmission antennas 23. The number of the transmission antennas 23 and the number of the transmission units 2 may not always match each other. For example, one transmission unit 2 may be provided for three transmission antennas 23, and connection between each transmission antenna 23 and the transmission units 2 may be switched by a switch.

Each of the three transmission antennas 23 receives the transmission signal from a different transmission unit 2, transforms the transmission signal into a transmission wave TW, and outputs the transmission wave TW. The transmission signals output from the three transmission units 2 are signals orthogonal to each other (orthogonal signals). To be orthogonal means that the signals do not interfere with each other, for example, due to differences in time, phase, frequency, code, and the like.

The reception unit 3 includes plural reception antennas 31 and plural individual reception units 32. That is, the radar device 1 includes plural antennas 31 which acquire reception signals. One individual reception unit 32 is connected to each reception antenna 31. Each reception antenna 31 receives a reflected wave RW from a target, acquires a reception signal, and outputs the reception signal to each individual reception unit 32. In the present embodiment, the reception unit 3 includes two reception antennas 31 and two individual reception units 32. However, the number of the reception antennas 31 may be any number other than two as long as the number is a plural number. The number of the individual reception units 32 may be smaller than the number of the reception antennas 31 by employing a switch.

Each individual reception unit 32 processes the reception signal obtained by the corresponding reception antenna 31. The individual reception unit 32 includes a mixer 33 and an A/D converter 34. The reception signal obtained by the reception antenna 31 is amplified by a low noise amplifier (not shown) and then sent to the mixer 33. The transmission signal from each oscillator 22 of each transmission unit 2 is input to the mixer 33, and each transmission signal and the reception signal are mixed in the mixer 33. Accordingly, beat signals, which have beat frequencies, are generated. The beat frequencies are differences between frequencies of each transmission signal and a frequency of the reception signal. The beat signal generated by the mixer 33 is converted into a digital signal by the A/D converter 34 and then output to the signal processing device 4.

The signal processing device 4 performs various types of processing based on each beat signal obtained via each A/D converter 34. The signal processing device 4 includes a microcomputer including a central processing unit (CPU), a memory 41, and the like. The signal processing device 4 stores various data to be calculated in the memory 41, which is a storage device. The memory 41 is, for example, a random access memory (RAM). The signal processing device 4 includes a transmission control unit 42, a transform unit 43, and a data processing unit 44, as functions implemented by software in the microcomputer. The transmission control unit 42 controls the signal generation units 21 of each transmission unit 2.

Since the reception antenna 31 receives the reflected waves from plural targets in an overlapping state, the transform unit 43 performs processing of separating frequency components based on the reflected waves of the targets from the beat signal generated based on the reception signal. In the present embodiment, the transform unit 43 separates the frequency components by fast Fourier transform (FFT) processing. In the FFT processing, reception level and phase information are calculated for each frequency point (may also be referred to as frequency bin) set at a predetermined frequency interval. The transform unit 43 outputs a result of the FFT processing to the data processing unit 44.

Specifically, the transform unit 43 performs two-dimensional FFT processing on the beat signals output from each A/D converter 34. By performing a first FFT processing, a frequency spectrum in which a peak appears in a frequency bin corresponding to the distance to the target (hereinafter also referred to as a distance bin) is obtained. By arranging the frequency spectrum obtained by the first FFT processing in time series and performing a second FFT processing, a frequency spectrum in which a peak appears in a frequency bin with respect to Doppler frequency is obtained (hereinafter also referred to as "velocity bin"). The transform unit 43 obtains a two-dimensional power spectrum, in which the distance bin and the velocity bin serve as axes, by a two-dimensional FFT processing.

The data processing unit 44 includes a peak extraction unit 45, an acquisition unit 46, a path determination unit 47, a distance/relative velocity calculation unit 48, and an azimuth calculation unit 49. That is, the signal processing device 4 includes the acquisition unit 46.

The peak extraction unit 45 extracts a peak from a result of the FFT processing or the like of the transform unit 43. In the present embodiment, the peak extraction unit 45 extracts a peak indicating a power value equal to or greater than a predetermined value based on the two-dimensional power spectrum, in which the distance bin and the velocity bin serve as the axes, obtained by the two-dimensional FFT processing.

The acquisition unit 46 acquires phase information of a reception signal for each of plural virtual antennas generated by a combination of plural transmission antennas 23 and plural reception antennas 31. Specifically, the acquisition unit 46 classifies results of the peak extraction performed by the peak extraction unit 45 into results for each virtual antenna. Then the acquisition unit 46 acquires phase information of each peak extracted by the peak extraction unit 45 for each virtual antenna. The virtual antenna will be described below.

The path determination unit 47 focuses on peaks of the same frequency bin extracted by the peak extraction unit 45 for each virtual antenna, and determines whether the outward path and the return path match each other based on the phase information acquired by the acquisition unit 46. When there are plural peaks having different frequency bins, the path determination unit 47 determines whether the outward path and the return path match each other for each peak. Here, the outward path is a path along which the transmission wave TW transmitted from the transmission antenna 23 reaches the target. The return path is a path along which the reflected wave RW reflected by the target reaches the reception antenna 31. A state in which the outward path and the return path match each other not only refers to a state in which the outward path and the return path match each other perfectly, but may also include a state in which the outward path and the return path are considered as matching each other when taking variations and the like into consideration. The path determination unit 47 will be described in detail below.

The distance/relative velocity calculation unit 48 derives the distance and relative velocity with respect to the target based on a combination of a distance bin and a velocity bin specified by the peak extraction unit 45 as having peaks.

The azimuth calculation unit 49 estimates an azimuth in which the target exists based on a result of the peak extraction acquired for each virtual antenna. Known methods are used for the azimuth estimation, such as multiple signal classification (MUSIC) and estimation of signal parameters via rotational invariance techniques (ESPRIT).

Target data including the distance to the target, the relative velocity of the target, and the azimuth in which the target is present, obtained by the distance/relative velocity calculation unit 48 and the azimuth calculation unit 49, is output to the vehicle ECU 5.

<2. Virtual Antenna>

Figure 2A:
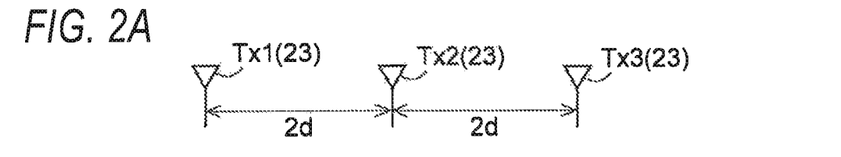
FIGS. 2A, 2B, and 2C show antennas included in the radar device.
Figure 2B:
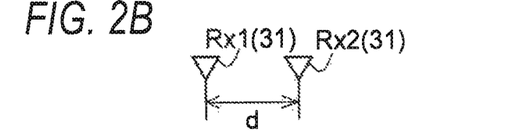
Figure 2C:
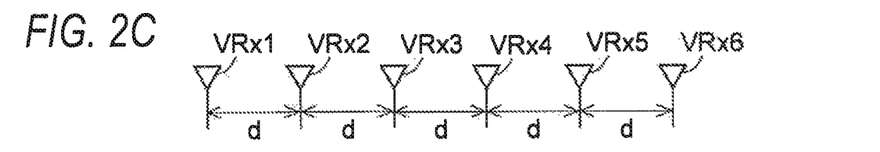

FIGS. 2A, 2B and 2C show antennas included in the radar device 1 according to the embodiment of the present disclosure.

In the present embodiment, as shown in FIG. 2A, the three transmission antennas 23 are arranged at the same antenna interval 2d along a horizontal direction. As shown in FIG. 2B, the two reception antennas 31 are arranged at an antenna interval d along the horizontal direction. The antenna interval between adjacent transmission antennas 23 may not be exactly the same in plural sets (two sets of three transmission antennas 23), and is acceptable as long as the intervals can be regarded as being the same in the plural sets when taking design errors, variations, and the like into consideration. The antenna interval between two adjacent transmission antennas 23 may not be exactly twice the antenna interval between the two adjacent reception antennas 31, and is acceptable as long as the interval can be regarded as being twice the antenna interval between the two adjacent reception antennas 31 when taking design errors, variations, and the like into consideration.

A virtual array antenna shown in FIG. 2C is generated by a combination of the three transmission antennas 23 shown in FIG. 2A and the two reception antennas 31 shown in FIG. 2B. The virtual array antenna shown in FIG. 2C includes six virtual antennas VRx1 to VRx6. The six virtual antennas VRx1 to VRx6 are arranged at the same antenna interval d along the horizontal direction. By applying MIMO technology, virtual antennas exceeding the number of reception antennas can be obtained.

Figure 3:
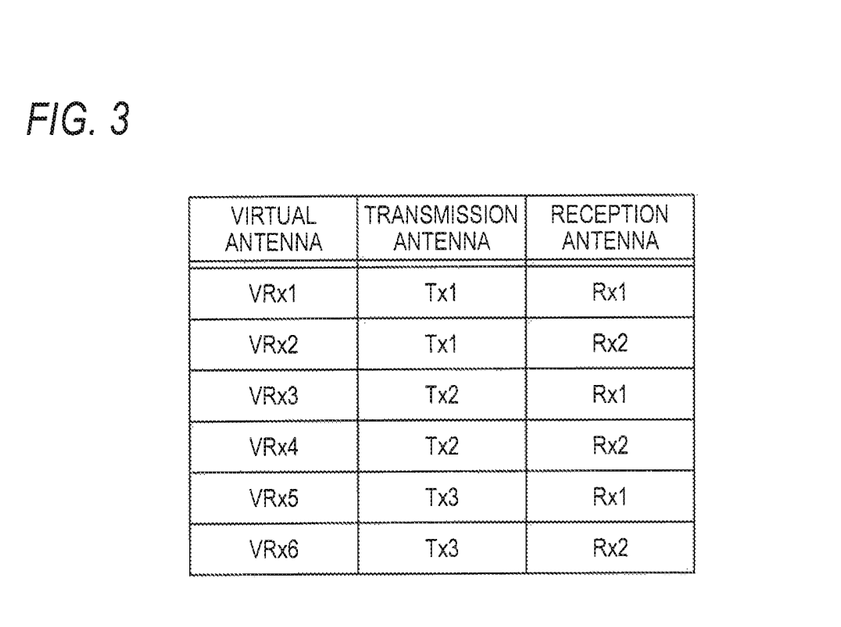
FIG. 3 shows combinations of transmission antennas and reception antennas constituting each virtual antenna.

FIG. 3 shows combinations of the transmission antennas 23 and the reception antennas 31 constituting each of the virtual antennas VRx1 to VRx6. As shown in FIG. 3, the first virtual antenna VRx1 is generated by a combination of a first transmission antenna Tx1 and a first reception antenna Rx1. A second virtual antenna VRx2 is generated by a combination of the first transmission antenna Tx1 and a second reception antenna Rx2. A third virtual antenna VRx3 is generated by a combination of a second transmission antenna Tx2 and the first reception antenna Rx1. A fourth virtual antenna VRx4 is generated by a combination of the second transmission antenna Tx2 and the second reception antenna Rx2. A fifth virtual antenna VRx5 is generated by a combination of a third transmission antenna Tx3 and the first reception antenna Rx1. A sixth virtual antenna VRx6 is generated by a combination of the third transmission antenna Tx3 and the second reception antenna Rx2.

That is, a reception signal of the first reception antenna Rx1 includes a reception signal of the first virtual antenna VRx1, a reception signal of the third virtual antenna VRx3, and a reception signal of the fifth virtual antenna VRx5, which are orthogonal to each other. A reception signal of the second reception antenna Rx2 includes a reception signal of the second virtual antenna VRx2, a reception signal of the fourth virtual antenna VRx4, and a reception signal of the sixth virtual antenna VRx6, which are orthogonal to each other.

<3. Determination of Match/Mismatch Between Outward Path and Return Path>

Figure 4A:
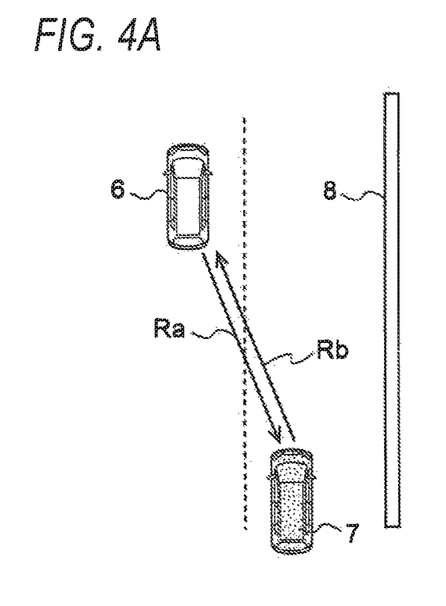
FIGS. 4A and 4B show match and mismatch between an outward path and a return path.
Figure 4B:
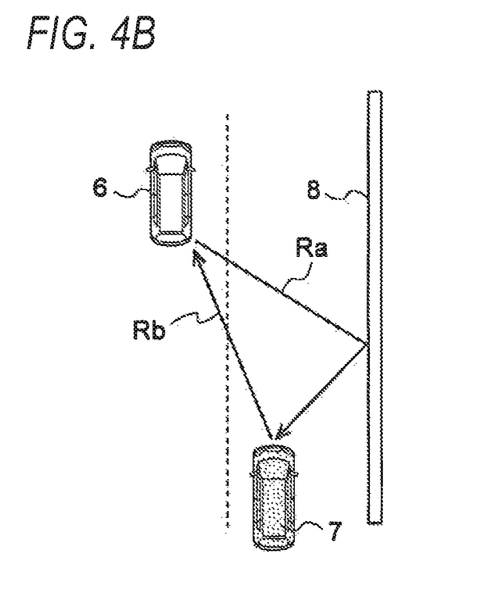

FIGS. 4A and 4B show match and mismatch between an outward path and a return path. In FIGS. 4A and 4B, a front vehicle 6 is the given vehicle, and a rear vehicle 7 is the target detected by the radar device 1. In FIGS. 4A and 4B, reference numeral 8 denotes a guardrail.

In FIG. 4A, an outward path Ra along which the transmission wave TW transmitted from the transmission antenna 23 of the given vehicle 6 reaches the other vehicle 7 and a return path Rb along which the reflected wave RW reflected by the other vehicle 7 reaches the reception antenna 31 of the given vehicle 6 match with each other. In the radar device 1, the target data is obtained on an assumption that the outward path Ra and the return path Rb match each other.

In FIG. 4B, the transmission wave TW transmitted from the transmission antenna 23 of the given vehicle 6 reaches the other vehicle 7 after being reflected by the guardrail 8 (the path Ra indicated by a solid line). Meanwhile, the reflected wave RW reflected by the other vehicle 7 reaches the reception antenna 31 of the given vehicle 6 without passing through the guardrail 8 (the path Rb indicated by a solid line). That is, the reflected wave RW reaches the reception antenna 31 via the path (return path) Rb which is different from the outward path Ra.

Some of the reflected waves RW reflected by the other vehicle 7 are received by the reception antenna 31 through the path Rb which does not match the outward path Ra as shown in FIG. 4B. A reception signal of the reflected wave RW passing through the path Rb different from the outward path Ra does not conform with the assumption for the signal processing, and is an unnecessary signal that causes erroneous target data calculation, which needs to be removed. The signal processing device 4 performs processing of determining whether the outward path Ra and the return path Rb match each other so as to enable removal of such an unnecessary signal.

As an example in which the outward path Ra and the return path Rb do not match each other, a case where the transmission wave TW transmitted from the transmission antenna 23 of the given vehicle 6 travels in an opposite direction to the reflected wave RW indicated by the solid line in FIG. 4B while the reflected wave RW reflected by the other vehicle 7 travels in an opposite direction to the transmission wave TW indicated by the solid line in FIG. 4B is exemplified.

Figure 5A:
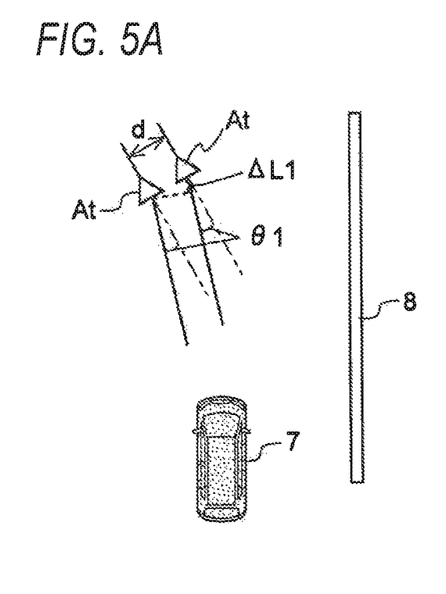
FIGS. 5A and 5B show a phase difference generated between the antennas when the outward path and the return path match each other.
Figure 5B:
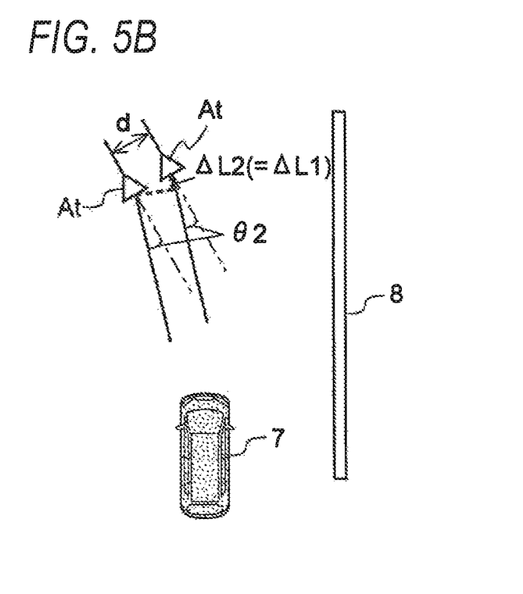
Figure 6A:
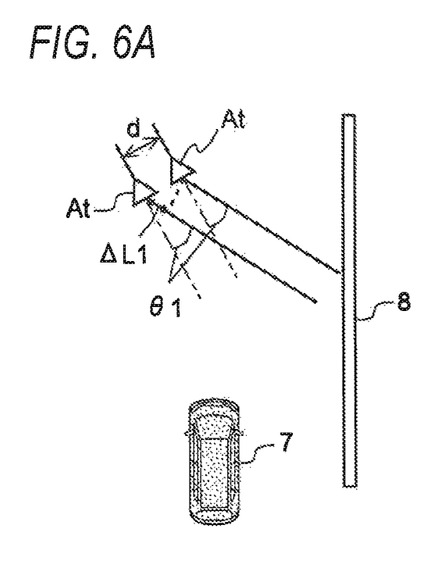
FIGS. 6A and 6B show a phase difference generated between the antennas when the outward path and the return path do not match each other.
Figure 6B:
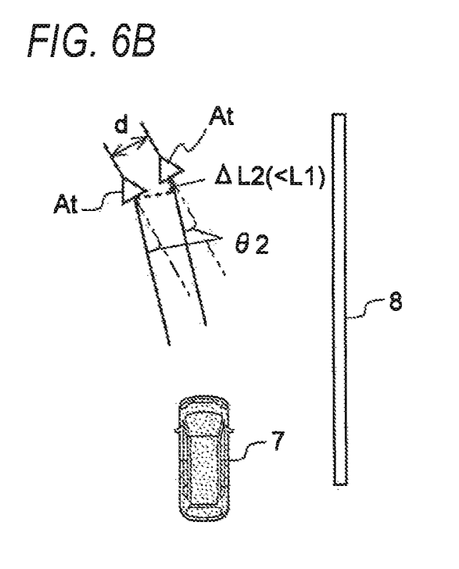

FIGS. 5A and 5B show a phase difference generated between antennas At when the outward path and the return path match each other. FIGS. 6A and 6B show a phase difference generated between the antennas At when the outward path and the return path do not match each other. FIGS. 5A and 6A show phase differences generated in the outward path, and FIGS. 5B and 6B show phase differences generated in the return path. In FIGS. 5A, 5B, 6A and 6B, two antennas At are arranged at an antenna interval d along the horizontal direction. The antenna At is a transmission antenna in the description of the outward path, and is a reception antenna in the description of the return path.

As for path lengths of the transmission waves TW transmitted from each antenna At in the same direction, a difference ($=\Delta L1$) represented by the following formula (1) is generated between two antennas At. That is, in the outward path, the path length difference $\Delta L1$ represented by the following formula (1) is generated.

$$\Delta L1 = d \cdot \sin \theta 1 \quad (1)$$

$\theta 1$ is a transmission angle of the transmission wave TW.

As for path lengths of the reflected waves RW incident from the same direction toward each antenna At, a difference ($=\Delta L2$) represented by the following formula (2) is generated between two antennas At. That is, in the return path, the path length difference $\Delta L2$ represented by the following formula (2) is generated.

$$\Delta L2 = d \cdot \sin \theta 2 \quad (2)$$

$\theta 2$ is an incident angle of the reflected wave RW.

When the outward path and the return path match each other, $\theta 1 = \theta 2$, and $\Delta L1 = \Delta L2$ (see FIGS. 5A and 5B). The phase difference generated between the two antennas At is determined in accordance with the path length difference. For this reason, when the outward path and the return path match each other, the phase difference generated between the two antennas At is equal in the outward path and the return path.

Meanwhile, when the outward path and the return path do not match each other, since $\theta 1$ and $\theta 2$ are different, $\Delta L1$ and $\Delta L2$ also have different values (see FIGS. 6A and 6B). Since the phase difference generated between the two antennas At is determined in accordance with the path length difference, when the outward path and the return path do not match each other, the phase difference between the two antennas At is different in the outward path and the return path.

That is, if the phase difference generated in the outward path and the phase difference generated in the return path can be compared, it can be determined whether the outward path and the return path match each other. The path determination unit 47 of the present embodiment uses this concept to determine whether the outward path and the return path match each other.

Figure 7:
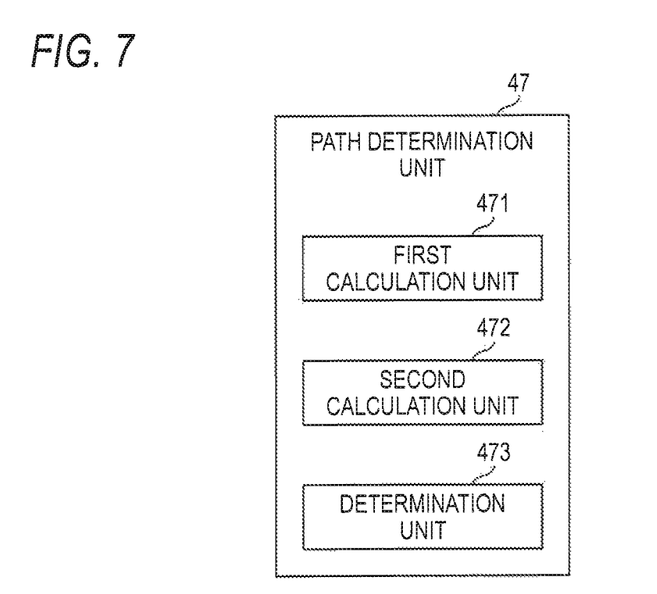
FIG. 7 is a block diagram showing a function of a path determination unit.

FIG. 7 is a block diagram showing a function of the path determination unit 47 according to the embodiment of the present invention. As shown in FIG. 7, the path determination unit 47 includes a first calculation unit 471, a second calculation unit 472, and a determination unit 473. That is, the signal processing device 4 includes the first calculation unit 471, the second calculation unit 472, and the determination unit 473.

The first calculation unit 471 calculates a first phase difference based on the phase information. The first phase difference is a phase difference generated between the transmission antennas 23 in the outward path along which the transmission wave TW transmitted from the transmission antenna 23 reaches the target. The phase information is phase information of reception signals of the virtual antennas VRx1 to VRx6. The phase information is obtained by the FFT processing performed by the transform unit 43. The first calculation unit 471 focuses on peaks of the same frequency bin extracted by the peak extraction unit 45 for each of the virtual antennas VRx1 to VRx6, and calculates the first phase difference based on the phase information acquired by the acquisition unit 46. The first calculation unit 471 calculates the first phase difference for each peak when there are plural peaks having different frequency bins.

Specifically, the first calculation unit 471 calculates the first phase difference by comparing the phase information between plural virtual antennas generated by combining different transmission antennas 23 with respect to a predetermined reception antenna 31. In the present embodiment, the predetermined reception antenna 31 is one of the first reception antenna Rx1 and the second reception antenna Rx2. The transmission antenna 23 combined with the first reception antenna Rx1 or the second reception antenna Rx2 is one of the first transmission antenna Tx1, the second transmission antenna Tx2, or the third transmission antenna Tx3.

For example, the first calculation unit 471 calculates the first phase difference by comparing the phase information between the first virtual antenna VRx1 (see FIG. 3) generated by combining the first reception antenna Rx1 with the first transmission antenna Tx1 and the third virtual antenna VRx3 (see FIG. 3) generated by combining the first reception antenna Rx1 with the second transmission antenna Tx2.

According to the present embodiment, the reception antennas 31 constituting the virtual antennas are the same between the two virtual antennas to be compared. For this reason, by comparing the phase information between the two virtual antennas, the phase difference generated between the two transmission antennas 23 (the first phase difference) can be obtained. That is, the phase difference generated in the outward path can be obtained by comparing the phase information between the two virtual antennas.

The first calculation unit 471 may calculate the first phase difference by a combination other than the combination of the first virtual antenna VRx1 and the third virtual antenna VRx3. For example, the first calculation unit 471 may calculate the first phase difference by a combination of the third virtual antenna VRx3 and the fifth virtual antenna VRx5, a combination of the second virtual antenna VRx2 and the fourth virtual antenna VRx4, or a combination of the fourth virtual antenna VRx4 and the sixth virtual antenna VRx6. The first calculation unit 471 may calculate only one first phase difference for each peak, or may calculate plural first phase differences for each peak.

When determining the combination of the virtual antennas for calculating the first phase difference, the first calculation unit 471 preferably selects a combination in which the transmission antennas 23 constituting the virtual antennas are adjacent transmission antennas, in consideration of, for example, reducing the number of times of phase reflection. The combination of the first virtual antenna VRx1 and the third virtual antenna VRx3, the combination of the third virtual antenna VRx3 and the fifth virtual antenna VRx5, the combination of the second virtual antenna VRx2 and the fourth virtual antenna VRx4, and the combination of the fourth virtual antenna VRx4 and the sixth virtual antenna VRx6 are exemplified as the combinations in which the transmission antennas 23 constituting the virtual antennas are adjacent transmission antennas.

The second calculation unit 472 calculates a second phase difference based on the phase information. The second phase difference is a phase difference generated between the reception antennas 31 in the return path along which the reflected wave RW reflected by the target reaches the reception antenna 31. The phase information is phase information of reception signals of the virtual antennas VRx1 to VRx6. The phase information is obtained by the FFT processing performed by the transform unit 43. Similarly to the first calculation unit 471, the second calculation unit 472 focuses on the peaks of the same frequency bin extracted by the peak extraction unit 45 for each of the virtual antennas VRx1 to VRx6, and calculates the second phase difference based on the phase information acquired by the acquisition unit 46. The second calculation unit 472 calculates second phase difference calculation processing on each peak for which the first calculation unit 471 has calculated the first phase difference.

Specifically, the second calculation unit 472 calculates the second phase difference by comparing the phase information between plural virtual antennas generated by combining different reception antennas 31 with respect to a predetermined transmission antenna 23. In the present embodiment, the predetermined transmission antenna 23 is one of the first transmission antenna Tx1, the second transmission antenna Tx2, or the third transmission antenna Tx3. The reception antenna 31 combined with the one of the first transmission antenna Tx1, the second transmission antenna Tx2, or the third transmission antenna Tx3 is one of the first reception antenna Rx1 or the second reception antenna Rx2.

For example, the second calculation unit 472 calculates the second phase difference by comparing the phase information between the first virtual antenna VRx1 (see FIG. 3) generated by combining the first transmission antenna Tx1 and the first reception antenna Rx1 and the second virtual antenna VRx2 (see FIG. 3) generated by combining the first transmission antenna Tx1 and the second reception antenna Rx2.

According to the present embodiment, the transmission antennas 23 constituting the virtual antennas are the same between the two virtual antennas to be compared. For this reason, by comparing the phase information between the two virtual antennas, the phase difference generated between the two reception antennas 31 (the second phase difference) can be obtained. That is, the phase difference generated in the return path can be obtained by comparing the phase information between the two virtual antennas.

The second calculation unit 472 may calculate the second phase difference by a combination other than the combination of the first virtual antenna VRx1 and the second virtual antenna VRx2. For example, the second calculation unit 472 may calculate the second phase difference by a combination of the third virtual antenna VRx3 and the fourth virtual antenna VRx4 or a combination of the fifth virtual antenna VRx5 and the sixth virtual antenna VRx6.

The second calculation unit 472 may calculate only one second phase difference for each peak, or may calculate plural second phase differences for each peak. When determining the combination of the virtual antennas for calculating the second phase difference, the second calculation unit 472 preferably selects a combination in which the reception antennas 31 constituting the virtual antennas are adjacent reception antennas, in consideration of, for example, reducing the number of times of phase reflection.

The determination unit 473 determines whether the outward path and the return path match each other based on the first phase difference and the second phase difference. Specifically, the determination unit 473 determines whether the outward path and the return path match each other based on the first phase difference and the second phase difference for each peak for which the first phase difference and the second phase difference are calculated.

When there is only one first phase difference obtained by the first calculation unit 471 and one second phase difference obtained by the second calculation unit 472 for each peak, the determination unit 473 determines whether the outward path and the return path match each other based on the one first phase difference and the one second phase difference. When there are plural first phase differences obtained by the first calculation unit 471 for each peak, the determination unit 473 uses an average value of the plural first phase differences. When there are plural second phase differences obtained by the second calculation unit 472 for each peak, the determination unit 473 uses an average value of the plural second phase differences.

The determination unit 473 determines whether the outward path and the return path match each other based on the first phase difference and the second phase difference when the phase differences are phase differences of the same antenna interval. For example, it is assumed that the first phase difference is obtained by the combination of the first virtual antenna VRx1 and the third virtual antenna VRx3, and the second phase difference is obtained by the combination of the first virtual antenna VRx1 and the second virtual antenna VRx2. In this case, the first phase difference is a phase difference between the first transmission antenna Tx1 and the second transmission antenna Tx2 having an antenna interval of 2d therebetween. The second phase difference is a phase difference between the first reception antenna Rx1 and the second reception antenna Rx2 having an antenna interval of d therebetween. That is, since the first phase difference and the second phase difference are phase differences of different antenna intervals, the phase differences cannot be directly compared. In this regard, according to the present embodiment, the first phase difference and the second phase difference are phase differences of the same antenna interval, so that it can be determined whether the outward path and the return path match each other by comparing the two phase differences.

In the present embodiment, by using the plural virtual antennas, the phase difference generated in the outward path (the first phase difference) and the phase difference generated in the return path (the second phase difference) can be easily obtained to determine whether the outward path and the return path match each other. For this reason, whether the outward path and the return path match each other can be determined while an increase in a processing load is reduced.

Figure 8:
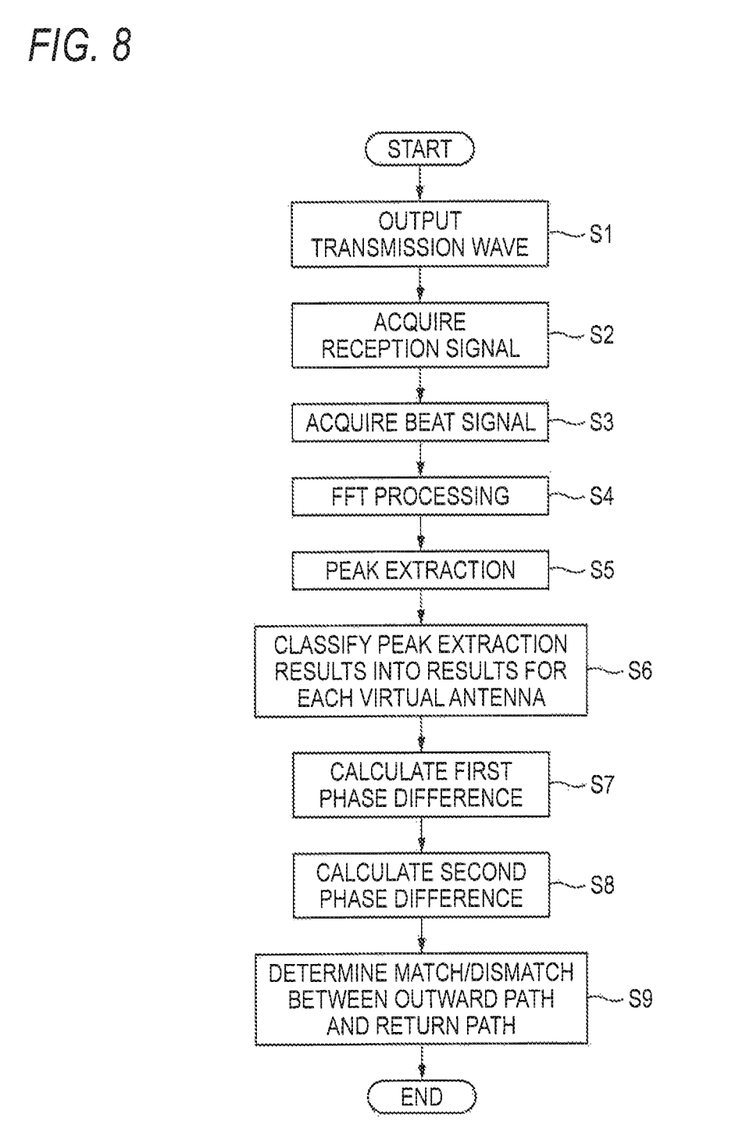
FIG. 8 is a flowchart showing a schematic operation of the radar device.

FIG. 8 is a flowchart showing a schematic operation of the radar device 1 according to the embodiment of the present invention. FIG. 8 mainly shows processing of determining whether the outward path and the return path match each other. The radar device 1 periodically repeats the processing shown in FIG. 8 at regular time intervals.

First, the transmission antenna 23 outputs the transmission wave TW (step S1). Next, the reception antenna 31 receives the reflected wave RW reflected by the target and acquires the reception signal (step S2). Next, the signal processing device 4 acquires a predetermined number of beat signals (step S3). Next, the transform unit 43 performs the FFT processing on the acquired beat signals (step S4).

Next, the peak extraction unit 45 performs peak extraction based on a result of the FFT processing (step S5). The peak extracting unit 45 performs processing of storing the phase information obtained by the FFT processing for each extracted peak. Then the acquisition unit 46 classifies results of the peak extraction performed by the peak extraction unit 45 into results for each of the virtual antennas VRx1 to VRx6 (step S6).

Figure 9:
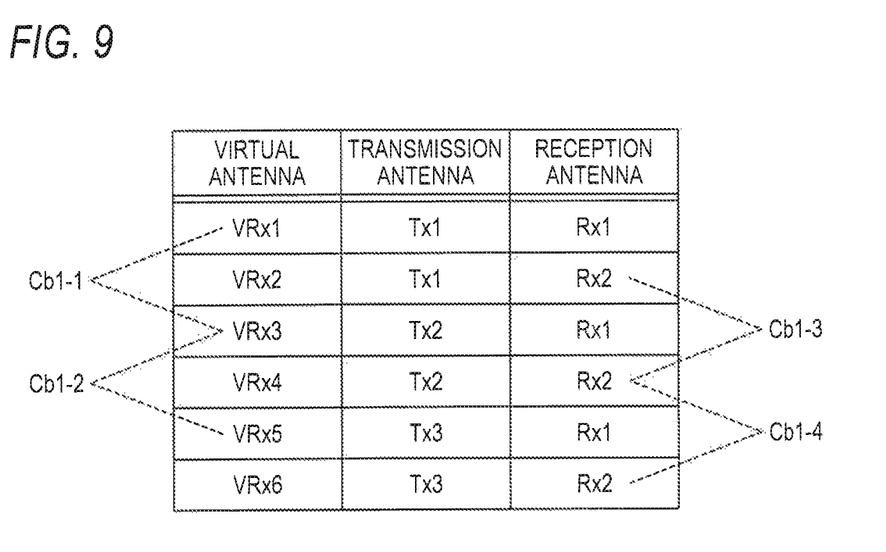
FIG. 9 shows first phase difference calculation processing.

Next, the first calculation unit 471 performs first phase difference calculation processing on each of the peaks having different frequency bins (step S7). FIG. 9 shows the first phase difference calculation processing of the present embodiment. In FIG. 9, Cb1-1, Cb1-2, Cb1-3, and Cb1-4 denote virtual antenna combinations for obtaining the first phase difference. That is, in the present embodiment, the first calculation unit 471 calculates four first phase differences using the four virtual antenna combinations Cb1-1 to Cb1-4 for each peak.

Specifically, the first calculation unit 471 calculates the first phase difference by comparing the phase information of the first virtual antenna VRx1 with the phase information of the third virtual antenna VRx3 for each peak. The first calculation unit 471 calculates the first phase difference by comparing the phase information of the third virtual antenna VRx3 with the phase information of the fifth virtual antenna VRx5 for each peak. The first calculation unit 471 calculates the first phase difference by comparing the phase information of the second virtual antenna VRx2 with the phase information of the fourth virtual antenna VRx4 for each peak. The first calculation unit 471 calculates the first phase difference by comparing the phase information of the fourth virtual antenna VRx4 with the phase information of the sixth virtual antenna VRx6 for each peak. That is, the four first phase differences are obtained for each peak.

Figure 10:
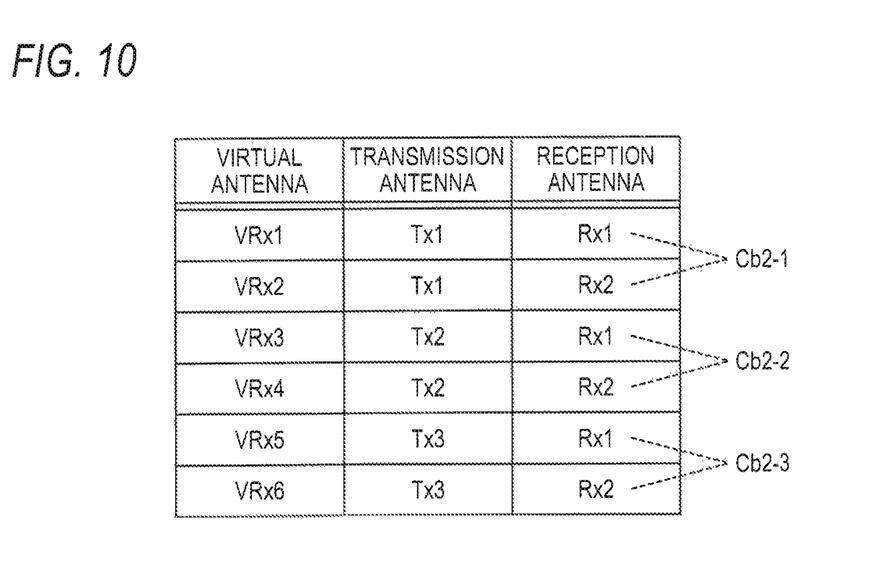
FIG. 10 shows second phase difference calculation processing.

Next, the second calculation unit 472 performs second phase difference calculation processing on each of the peaks for which the first phase differences have calculated (step S8). FIG. 10 shows the second phase difference calculation processing of the present embodiment. In FIG. 10, Cb2-1, Cb2-2, and Cb2-3 denote virtual antenna combinations for obtaining the second phase difference. That is, in the present embodiment, the second calculation unit 472 calculates three second phase differences using the three virtual antenna combinations Cb2-1, Cb2-2, and Cb2-3 for each peak.

Specifically, the second calculation unit 472 calculates the second phase difference by comparing the phase information of the first virtual antenna VRx1 with the phase information of the second virtual antenna VRx2 for each peak. The second calculation unit 472 calculates the second phase difference by comparing the phase information of the third virtual antenna VRx3 with the phase information of the fourth virtual antenna VRx4 for each peak. The second calculation unit 472 calculates the second phase difference by comparing the phase information of the fifth virtual antenna VRx5 with the phase information of the sixth virtual antenna VRx6 for each peak. That is, the three second phase differences are obtained for each peak.

Although the second phase difference is obtained by the second calculation unit 472 after the first phase difference is obtained by the first calculation unit 471 in the present embodiment, this is only an example. A configuration in which the first phase difference is obtained by the first calculation unit 471 after the second phase difference is obtained by the second calculation unit 472 may also be adopted. The processing of obtaining the first phase difference and the processing of obtaining the second phase difference may also be performed in parallel.

When the first phase difference and the second phase difference are obtained, the determination unit 473 determines whether the outward path and the return path match each other for each peak (step S9). The determination unit 473 determines whether the outward path and the return path match each other based on the average value of the plural first phase differences and the average value of the plural second phase differences. Accordingly, since whether the outward path and the return path match each other can be determined based on a large number of data, accuracy of the determination result can be improved. Specifically, the determination unit 473 determines, for each peak, whether the outward path and the return path match each other based on the average value of the four first phase differences and the average value of the three second phase differences. The average value of the first phase differences may be calculated by the first calculation unit 471 or may be calculated by the determination unit 473. The average value of the second phase differences may be calculated by the second calculation unit 472 or may be calculated by the determination unit 473.

The determination unit 473 compares the first phase difference and the second phase difference which are converted to phase differences of the same antenna interval. In the present embodiment, the antenna interval between the adjacent transmission antennas 23 is 2d, and the antenna interval between the adjacent reception antennas 31 is d. Therefore, a converted value of the first phase difference is a value obtained by dividing the first phase difference obtained in step S7 by comparing the phase information between the virtual antennas by two. A converted value of the second phase difference is the same as the second phase difference obtained in step S8 by comparing the phase information between the virtual antennas. The converted value of the first phase difference may be obtained by any one of the first calculation unit 471 or the determination unit 473. The converted value of the second phase difference may be obtained by any one of the second calculation unit 472 or the determination unit 473.

When a difference between the converted value of the first phase difference and the converted value of the second phase difference is substantially zero, the determination unit 473 determines that the outward path and the return path match each other. Meanwhile, when the difference between the converted value of the first phase difference and the converted value of the second phase difference is not recognized as substantially zero, the determination unit 473 determines that the outward path and the return path do not match each other. Here, the term "substantially zero" refers to a case where the difference is within a predetermined range including zero. The predetermined range is appropriately determined according to an experiment, a simulation, or the like.

According to the present embodiment, a peak whose outward path and return path do not match each other can be detected, and erroneous detection of a target that is not originally present (ghost) can be reduced. Whether each peak is derived from a ghost may be determined before deriving an instantaneous value of the target data. That is, the instantaneous value of the target data may not be derived for the peak determined as the ghost. Whether the peak is a ghost may be determined based on plural determination results of whether the outward path and the return path match each other.

<4. Consideration of Phase Reflection>

When the antenna interval d is larger than a half-wavelength of the radio wave, a so-called phase reflection occurs, in which the phase difference exceeds ±180° (±π). When the phase reflection occurs, a phase difference $\Delta\varphi=\varphi_0$ ($|\varphi_0|<\pi$) and a phase difference $\Delta\varphi=\varphi 0\pm2n\pi$ (n=1, 2, ...) cannot be distinguished from each other. In the above description, whether the outward path and the return path match each other is determined on the assumption that the phase reflection does not occur.

Here, a case where the antenna interval d is a half-wavelength of the transmission wave (the radio wave) is considered. In the present embodiment, since the interval between the adjacent transmission antennas 23 is 2d, the interval between the adjacent transmission antennas 23 is equal to one wavelength of the radio wave. Since the interval between the adjacent reception antennas 31 is d, the interval between the adjacent reception antennas 31 is equal to the half-wavelength of the radio wave. In this case, the phase difference between the adjacent reception antennas 31 does not exceed ±180°, and the phase reflection does not occur. Meanwhile, the phase difference between the adjacent transmission antennas 23 may exceed ±180°, and the phase reflection occurs. The phase difference between the adjacent transmission antennas 23 does not exceed 360°.

In this example, determination performed only based on the difference between the converted value of the first phase difference (the value obtained by dividing the first phase difference by two in the present embodiment) and the converted value of the second phase difference (the same as the second phase difference in the present embodiment) may lead to an inappropriate determination result. In this regard, the first calculation unit 471 further calculates, based on the first phase difference, a phase difference candidate value as a first phase reflection candidate value when there is phase reflection. The determination unit 473 determines whether the outward path and the return path match each other based on the first phase difference, the second phase difference, and the first phase reflection candidate value.

In this example, the first calculation unit 471 calculates a first candidate value obtained by adding 360° to the first phase difference and a second candidate value obtained by subtracting 360° from the first phase difference as the first phase reflection candidate value. The determination unit 473 calculates a difference between the converted value of the first phase difference (the value obtained by dividing the first phase difference by two) and the converted value of the second phase difference (the same as the second phase difference) as a first difference value. The determination unit 473 calculates a difference between a converted value of the first candidate value (a value obtained by dividing the first candidate value by two) and the converted value of the second phase difference as a second difference value. The determination unit 473 calculates a difference between a converted value of the second candidate value (a value obtained by dividing the second candidate value by two) and the converted value of the second phase difference as a third difference value.

Then the determination unit 473 determines that the outward path and the return path match each other when magnitude (absolute value) of the three difference values are compared and the difference value having the smallest magnitude is substantially zero. The determination unit 473 determines that the outward path and the return path do not match when the difference value having the smallest magnitude is not recognized as substantially zero.

In the above description, it is assumed that only one first phase difference and one second phase difference are calculated for each peak. However, in this example as well, plural first phase differences and plural second phase differences may be calculated for each peak. In this case, the first phase reflection candidate value may be obtained with respect to an average value of the plural first phase differences. A first phase reflection candidate value may be obtained for each first phase difference, and an average value of the obtained first phase reflection candidate values may be used for the determination. Similarly, the second phase reflection candidate value may be obtained with respect to an average value of the plural second phase differences. A second phase reflection candidate value may be obtained for each second phase difference, and an average value of the obtained second phase reflection candidate values may be used for the determination.

With the configuration of this example, even when the phase reflection occurs in the first phase difference, match/mismatch between the outward path and the return path can be appropriately determined. According to this configuration, a degree of freedom in designing a configuration of the antennas can be improved.

Although the number of the first phase reflection candidate values is two in this example, this is merely an example. In a case where the value of the antenna interval d is larger than that in this example, the number of the first phase reflection candidate values may be more than two.

In the case where the value of the antenna interval d is larger than that in this example, the phase difference between the adjacent reception antennas 31 may exceed ±180°, and the phase reflection may occur. In such a case, the second phase difference may be treated similarly to the first phase difference. That is, the second calculation unit 472 may further calculate, based on the second phase difference, a phase difference candidate value as a second phase reflection candidate value when there is phase reflection. The determination unit 473 may determine whether the outward path and the return path match each other based on the first phase difference, the second phase difference, the first phase reflection candidate value, and the second phase reflection candidate value.

<4. Attention>

Configurations of the embodiment and modification in the present description are merely examples of the present invention. The configurations of the embodiment and modification may be modified as appropriate without departing from the technical idea of the present invention. Plural embodiments and modifications may be implemented in combination within a possible range.

As described above, the antenna interval d between the transmission antennas 23 is longer than that between the reception antennas 31. However, this is an example, and the antenna interval d between the reception antennas 31 may be longer than that between the transmission antennas 23. For example, the configuration of the transmission antennas 23 of the embodiment described above may be used as the configuration of the reception antennas, and the configuration of the reception antennas 31 may be used as the configuration of the transmission antennas. That is, the virtual array antenna may be configured with two transmission antennas arranged at the antenna interval d along the horizontal direction and three reception antennas arranged at the same antenna interval 2d along the horizontal direction.

In the above configuration, the phase reflection may not occur in the first phase difference, and the phase reflection may occur in the second phase difference. In such a case, the second calculation unit 472 may calculate, based on the second phase difference, a phase difference candidate value as a second phase reflection candidate value when there is phase reflection. Then the determination unit 473 may determine whether the outward path and the return path match each other based on the first phase difference, the second phase difference, and the second phase reflection candidate value. With such a configuration, even when the phase reflection occurs in the second phase difference, match/mismatch between the outward path and the return path can be appropriately determined. According to this configuration, a degree of freedom in designing a configuration of the antennas can be improved.

Although the in-vehicle radar device has been described above, the present invention may be applied to an infrastructure radar device installed on a road or the like, a ship monitoring radar device, an aircraft monitoring radar device, or the like.

All or part of the functions described as being realized by execution of programs in the software may also be realized by an electrical hardware circuit. All or part of the functions described as implemented by the hardware circuit may be realized by software. The functions described as one block may be realized by cooperation of software and hardware. Each functional block is a conceptual component. The function executed by each functional block may be distributed to plural functional blocks, or the functions of plural functional blocks may be integrated into one functional block.

What is claimed is:

1. A radar device, comprising:
    a plurality of transmission antennas;
    a plurality of reception antennas; and
    a signal processing device that includes a hardware processor configured to:
        acquire phase information of a reception signal of each of a plurality of virtual antennas generated based on a combination of the plurality of transmission antennas and the plurality of reception antennas;
        calculate, based on the phase information, at least one first phase difference between the plurality of transmission antennas in an outward path along which a transmission wave transmitted from the plurality of transmission antenna reaches a target;
        calculate, based on the phase information, at least one second phase difference between the plurality of reception antennas in a return path along which a reflected wave reflected by the target reaches the plurality of reception antennas; and
        determine, based on the at least one first phase difference and the at least one second phase difference, whether the outward path and the return path match each other.

2. The radar device according to claim 1,
wherein the hardware processor calculates the at least one first phase difference by comparing the phase information for each of the plurality of virtual antennas with each other, the plurality of virtual antennas being generated by combining different transmission antennas of the plurality of transmission antennas with a predetermined reception antenna of the plurality of reception antennas, and
the hardware processor calculates the at least one second phase difference by comparing the phase information for each of the plurality of virtual antennas with each other, the plurality of virtual antennas being generated by combining different reception antennas of the plurality of reception antennas with a predetermined transmission antenna of the plurality of transmission antennas.

3. The radar device according to claim 2,
wherein the hardware processor determines whether the outward path and the return path match each other based on the at least one first phase difference and the at least one second phase difference in which a distance between the plurality of reception antennas is same as a distance between the plurality of transmission antennas in the at least one first phase difference.

4. The radar device according to claim 3,
wherein, in a case where the at least one first phase difference includes a plurality of first phase differences, the hardware processor uses an average value of the plurality of first phase differences as the at least one first phase difference in determining whether the outward path and the return path match each other, and,
in a case where the at least one second phase difference includes a plurality of second phase differences, the hardware processor uses an average value of the plurality of second phase differences as the at least one second phase difference in determining whether the outward path and the return path match each other.

5. The radar device according to claim 2,
wherein, in a case where the at least one first phase difference includes a plurality of first phase differences, the hardware processor uses an average value of the plurality of first phase differences as the at least one first phase difference in determining whether the outward path and the return path match each other, and,
in a case where the at least one second phase difference includes a plurality of second phase differences, the hardware processor uses an average value of the plurality of second phase differences as the at least one second phase difference in determining whether the outward path and the return path match each other.

6. The radar device according to claim 1,
wherein the hardware processor determines whether the outward path and the return path match each other based on the at least one first phase difference and the at least one second phase difference in which a distance between the plurality of reception antennas is same as a distance between the plurality of transmission antennas in the at least one first phase difference.

7. The radar device according to claim 6,
wherein, in a case where the at least one first phase difference includes a plurality of first phase differences, the hardware processor uses an average value of the plurality of first phase differences as the at least one first phase difference in determining whether the outward path and the return path match each other, and,
in a case where the at least one second phase difference includes a plurality of second phase differences, the hardware processor uses an average value of the plurality of second phase differences as the at least one second phase difference in determining whether the outward path and the return path match each other.

8. The radar device according to claim 1,
wherein, in a case where the at least one first phase difference includes a plurality of first phase differences, the hardware processor uses an average value of the plurality of first phase differences as the at least one first phase difference in determining whether the outward path and the return path match each other, and,
in a case where the at least one second phase difference includes a plurality of second phase differences, the hardware processor uses an average value of the plurality of second phase differences as the at least one second phase difference in determining whether the outward path and the return path match each other.

9. The radar device according to claim 1,
wherein the hardware processor further calculates, based on the at least one first phase difference, a first phase reflection candidate value which is a phase difference candidate value when a phase reflection occurs, and
the hardware processor determines whether the outward path and the return path match each other based on the at least one first phase difference, the at least one second phase difference, and the first phase reflection candidate value.

10. The radar device according to claim 1,
wherein the hardware processor calculates, based on the at least one second phase difference, a second phase reflection candidate value which is a phase difference candidate value when phase reflection occurs, and
the hardware processor determines whether the outward path and the return path match each other based on the at least one first phase difference, the at least one second phase difference, and the second phase reflection candidate value.

11. A signal processing method of a radar device that includes a hardware processor, a plurality of transmission antennas and a plurality of reception antennas, the method comprising:
transmitting, from the plurality of transmission antennas, radio waves and receiving, via the plurality of reception antennas, reflected waves corresponding to the transmitted radio waves reflected by a target;
the hardware processor acquiring phase information of a reception signal of each of a plurality of virtual antennas based on a combination of the plurality of transmission antennas and the plurality of reception antennas;
the hardware processor calculating, based on the phase information, at least one first phase difference between the plurality of transmission antennas in an outward path along which a transmission wave transmitted from the plurality of transmission antenna reaches the target;
the hardware processor calculating, based on the phase information, at least one second phase difference between the plurality of reception antennas in a return path along which a reflected wave reflected by the target reaches the plurality of reception antenna; and
the hardware processor determining, based on the at least one first phase difference and the at least one second phase difference, whether the outward path and the return path match each other.

* * * * *